C. J. NOEL AND K. K. HICKS.
MOTOR VEHICLE DRIVING MEANS.
APPLICATION FILED OCT. 20, 1919.
1,426,902.   Patented Aug. 22, 1922.
3 SHEETS—SHEET 1.
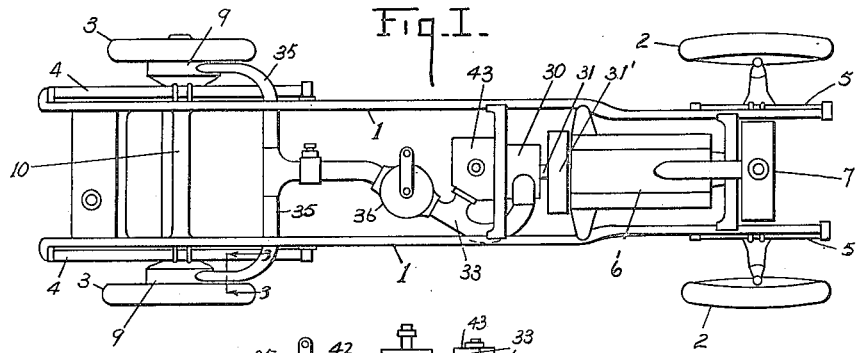
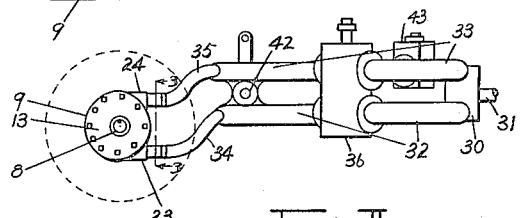
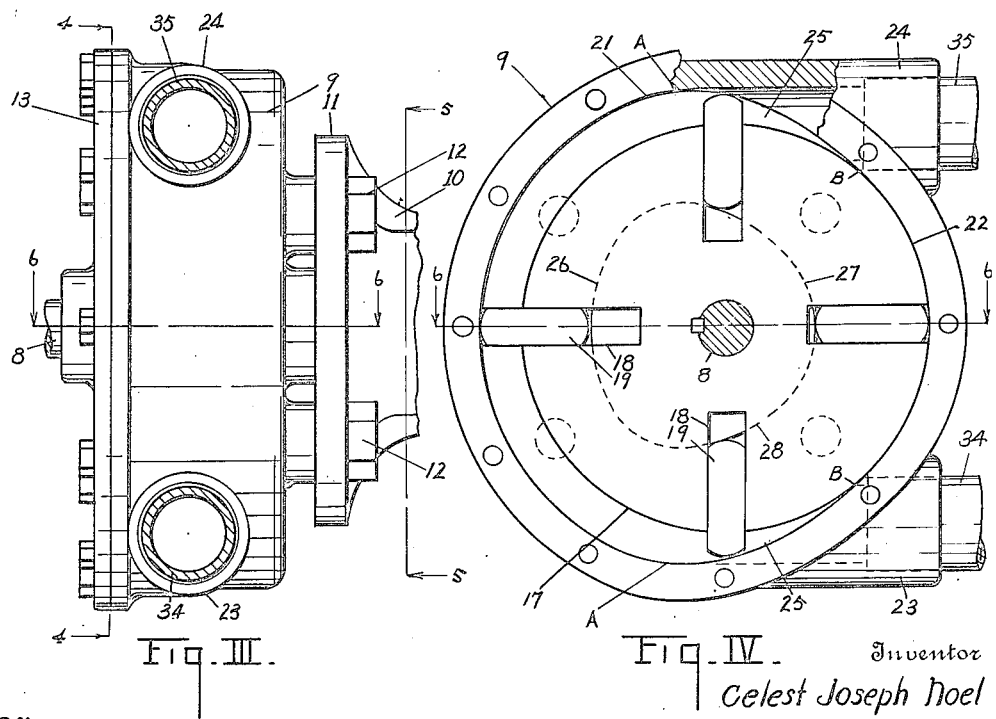
Inventor
Celest Joseph Noel
Kenneth K. Hicks

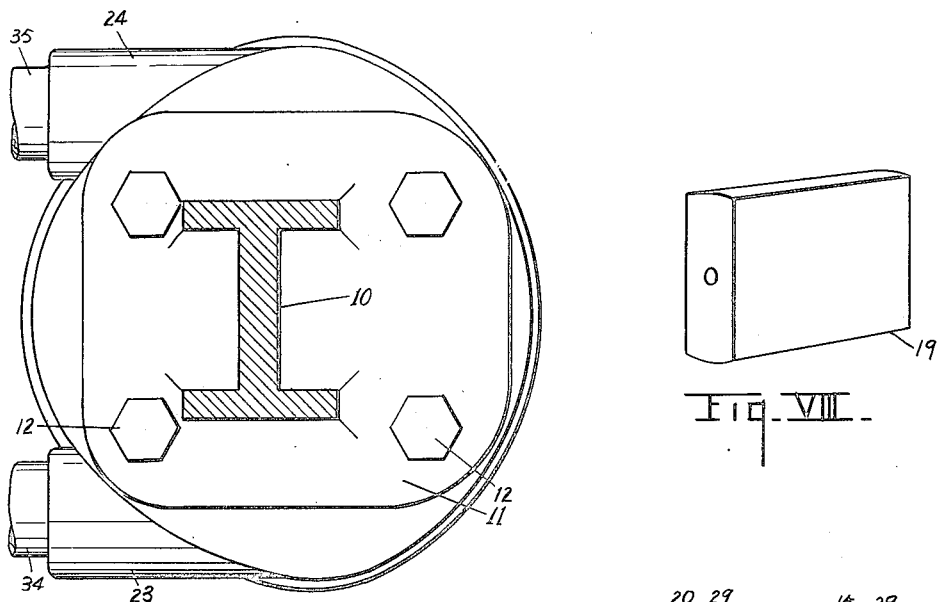
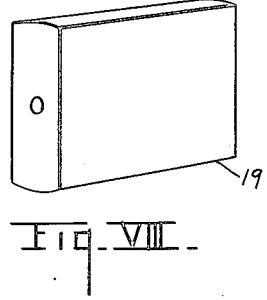
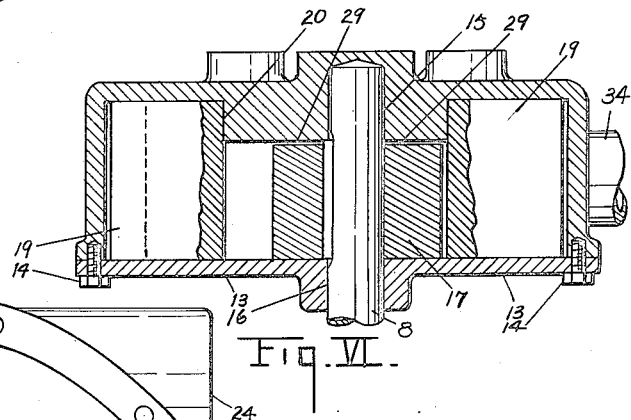
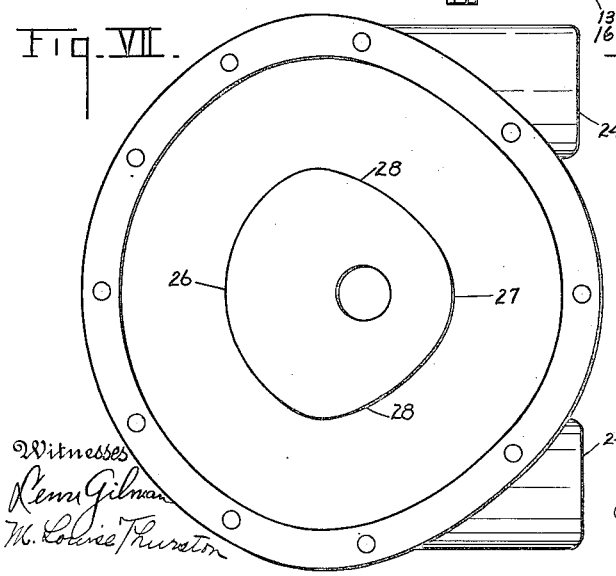

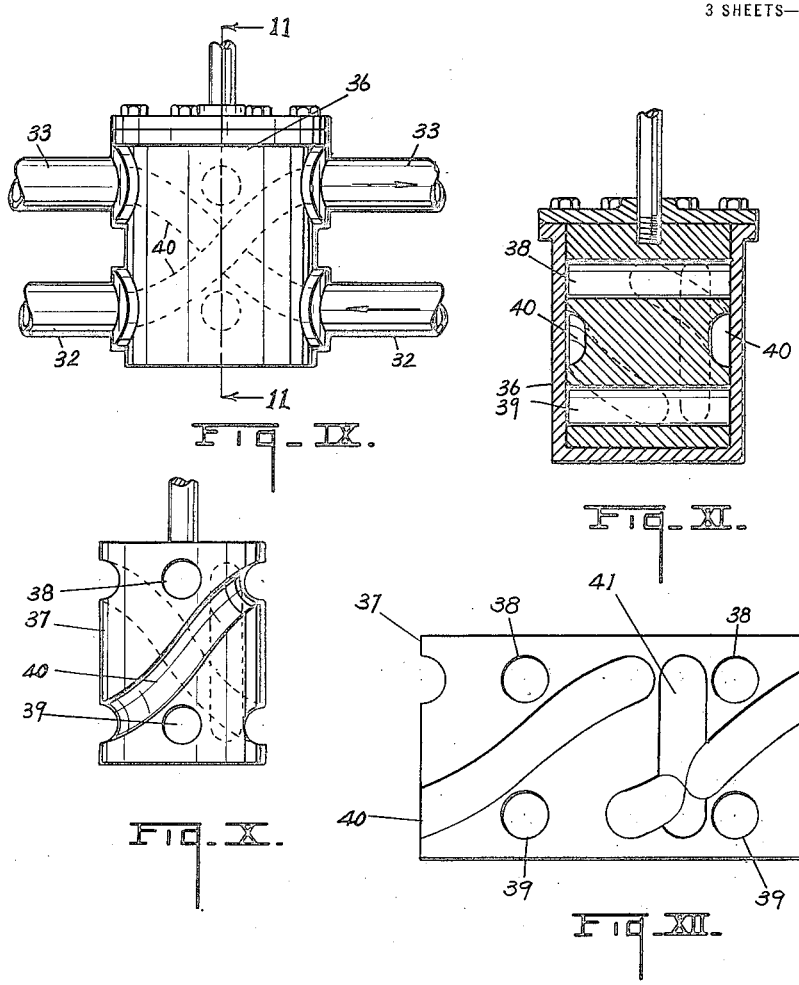

UNITED STATES PATENT OFFICE.

CELEST JOSEPH NOEL, OF DETROIT, AND KENNETH K. HICKS, OF GRAND RAPIDS, MICHIGAN, ASSIGNORS TO KIRK E. WICKS, TRUSTEE, OF GRAND RAPIDS, MICHIGAN.

MOTOR-VEHICLE DRIVING MEANS.

1,426,902.  Specification of Letters Patent.  Patented Aug. 22, 1922.

Application filed October 20, 1919. Serial No. 331,815.

*To all whom it may concern:*

Be it known that we, CELEST JOSEPH NOEL and KENNETH K. HICKS, citizens of the United States, residing at Detroit, county of Wayne, State of Michigan, and Grand Rapids, county of Kent, State of Michigan, respectively, have invented certain new and useful Improvements in Motor-Vehicle Driving Means, of which the following is a specification.

This invention relates to improvements in motor vehicle driving means.

The main objects of this invention are:

First, to provide in a motor vehicle an improved driving mechanism between the motor and the driving or traction wheels.

Second, to provide in a motor vehicle an improved means replacing the clutch, transmission, driving shafts, universal joints, driving gears, differential gears, driving axles and service brakes commonly employed in motor vehicles driven by internal combustion engines.

Third, to provide in a motor vehicle an improved driving means permitting the differential action of the driving wheels without the employment of a differential gearing.

Fourth, to provide in a motor vehicle an improved driving means permitting the reversing of the drive without the employment of reversing gears.

Fifth, to provide an improved driving means for motor vehicles having a large range of speed variation.

Sixth, to provide in a motor vehicle an improved combined driving and braking means.

Seventh, to provide in a motor vehicle an improved driving means which is very simple and economical in structure, light in weight and durable, and substantially noiseless in use.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing forming a part of this specification, in which:

Fig. I is a plan view of the chassis of a motor vehicle embodying the features of our invention, various parts being shown in conventional form for convenience in illustration.

Fig. II is a side elevation of parts of our improved driving mechanism, one of the driving wheels being indicated by dotted lines, the engine or power shaft being broken away.

Fig. III is an enlarged detail of one of the driven motors in section on a line corresponding to line 3—3 of Figs. I and II.

Fig. IV is a detail view on a line corresponding to line 4—4 of Fig. III, parts being broken away and sectioned to better illustrate the structural details.

Fig. V is a detail section on a line corresponding to line 5—5 of Fig. III.

Fig. VI is a horizontal section on a line corresponding to line 6—6 of Figs. III and IV.

Fig. VII is an inside view of one of the motor cylinders, corresponding to Fig. IV with the rotor and rotor blades removed.

Fig. VIII is a perspective view of one of the rotor blades.

Fig. IX is an enlarged detail side elevation of the control valve.

Fig. X is a side elevation of the control valve removed from its casing.

Fig. XI is a vertical section through the control valve on a line corresponding to line 11—11 of Fig. IX.

Fig. XII is a diagrammatical view of the control valve showing the arrangement and relation of the ports and passages thereof.

In the drawing similar reference characters refer to similar parts throughout the several views, and the sectional views are taken looking in the direction of the little arrows at the ends of the section lines.

Referring to the drawing, 1 represents the frame of the motor vehicle chassis, 2 the front or steering wheels and 3 the rear driving or traction wheels. The frame is supported by springs 4 and 5. 6 represents an internal combustion engine and 7 a radiator. These parts are all shown conventionally, as their structural details form no part of our invention.

The driving or traction wheels 3 are mounted on the shafts 8 of the driven motors 9 which are rigidly mounted on the ends of the rear axle 10, the axle 10 in the structure illustrated being provided with end plates 11 to which the body or cylinder of the motor 9 is secured by means of the bolts 12. The motor 9 is provided with a head plate 13 on its outer side detachably secured by means of screws 14.

The shaft 8 has a bearing 15 at its inner end and a bearing 16 in the plate 13. These bearings, we have shown conventionally, but it will be understood that in practice a roller or other suitable bearing may be provided, as desired. Further, we have not attempted to maintain or show the parts in relative proportion or size as to do so would complicate the illustration and would, we believe, be confusing.

The rotor 17 is keyed to the shaft 8 and provided with radial slots 18 for the blades 19. These blades are flat and of uniform thickness from edge to edge and from end to end, their outer edges being curved. The movement of the blades is controlled by the cam 20 disposed at the inner end of the cylinder to coact with the over-hanging ends of the blades.

The rotor is cylindrical while the cylinder has a portion 21 extending between the points $a$ to $a$ which is a true circle and concentric with the rotor. In other words, this circle centers in the rotor spindle.

The cylinder has a portion 22 between the points $b$—$b$ which is a true circle, concentric with the rotor and of such diameter that the rotor is a bearing fit therein. The ports 23 and 24 open into the cylinder between these points $a$—$b$, the portions 21 and 22 of the cylinder being joined by irregularly curved portions 25, the ports being of such scope as to substantially embrace these portions 25 so that the blades are not under pressure while they are being moved by the cam which has a portion 26 concentric with the portion 21 of the cylinder and a portion 27 concentric with the portion 22 of the cylinder. The shifting blade portions 28 of the cam correspond in curvature with the portions 25 of the cylinder so that while the blades are on their work stroke from points $a$ to $a$ or traveling over the portion 21 of the cylinder they are in a fixed position relative to the rotor. When they reach the point $a$ at the discharge port, the pressure on the blades is released so that they travel inward freely and with little wear or friction.

There is a space 29 between the rotor and the cam which neutralizes back pressure or prevents a back pressure on the blades.

We have only illustrated one of the driven motors in detail and it will be understood that the other is a duplicate thereof as is also the driving motor or pump 30, except that the latter is of less capacity.

The rotor of the driving motor or pump 30 is, in the structure illustrated, directly connected to the engine or driving shaft 31, the numeral 31' indicating the fly-wheel of such shaft.

We will now describe the connections or conduits by means of which the driving or transmission fluid is conducted from the driving motor to the driven motors described. This consists of conduits 32 and 33 which for convenience in description we designate herein as power and return, respectively. The power conduit 32 which is the discharge conduit of the driving motor is connected by the branches 34 to the inlets 23 of the driven motors while the return conduit 33 is connected by the branches 35 to the exhaust or discharge 24 of the driven motors. The connections 34 and 35 are preferably of flexible pipes to allow for the movement of the springs.

The pipes 32 and 33 are provided with a control valve 36 comprising a casing interposed in both pipes as shown in Fig. IX, and a rotary valve 37 having ports 38 and 39 therein providing when in one position which is its normal position for direct or forward drive, a direct connection for the power and return pipes to the driven motors. The valve also has spirally disposed passages 40 which are adapted to be brought into register with the conduits 32 and 33, thus providing a reverse connection therefor, or for the driven motors, so that the power is delivered to the driven motors through the ports 24, thus driving them in the reverse direction or providing a reverse drive for the vehicles.

The valve is provided with a by-pass passage 41 which connects the conduits 32 and 33 providing a by-pass connection therefor. This by-pass position is the normal position of the valve, in which position the circulation through the driven motors is cut off, thereby providing a brake for the traction or driving wheels. As the valve is moved from this position the amount of liquid flowing through the by-pass becomes less and less and the power is delivered to the driven motors thereby providing variation in speed from the minimum to the maximum. The dimensions of the driving motor or pump relative to the driven motors determines what might be designated as the normal ratio, a ratio of 3 to 1 in a motor vehicle of the pleasure type being satisfactory and a ratio of 6 to 1 in a truck. This, of course, may be varied, as desired.

As the valve is moved from its open to its initial or closed position, the flow of liquid through the driven motors is gradually checked until it is completely stopped, thus stopping the vehicle by a brake action on the wheel. The speed with which the valve is operated, of course, controls the braking action.

We also preferably provide a valved connection 42 for the power and return conduits at the rear of the control valve which provides a by-pass allowing the driving wheels to coast or run idle and also the engine to idle. This valve we show conventionally as its details form no part of our present invention.

The return pipe 33 is connected to a vented tank 43 which allows for expansion and contraction of the liquid and permits of the maintenance of a supply to make up for external leakage. This also allows the escape of air from the system and provides a convenient filling means therefor.

Our improved driving means is adapted to replace the clutch, transmission, driving shafts, universal joints, driving gears, differential gears, driving axles and service brakes commonly employed in motor vehicles, particularly those driven by internal combustion engines, not only greatly simplifying the structure but reducing weight, cost of manufacture and the up-keep of same.

We have illustrated and described our improvements quite largely in conventional form. We have not attempted to illustrate or describe the various modifications and adaptations which we contemplate and which might be desirable in adapting our improvements in different relations in practice as we believe the disclosure made will enable those skilled in the art to which our invention relates to embody or adapt the same as may be desired.

Having thus described our invention, what we claim as new and desire to secure by Letters Patent, is:

1. The combination with a running gear frame, an engine, an axle, and a pair of driving wheels, of a fluid driving motor connected directly to said engine, a pair of fluid driven motors mounted on said axle and comprising rotors having shafts on which said driving wheels are mounted, fluid connections for said driving and driven motors comprising a power and a return conduit each having branches connected to the inlets and discharges respectively of said driven motors, a control valve common to said power and return conduits and provided with passages and ports permitting the by-passing of a portion or all of the fluid from said power to said return conduit or the delivering of a portion or all of the fluid to said driven motors or the delivery of the fluid thereto in reverse direction for reversing the same, or cutting off the passage of the fluid through said driven motors providing a braking means, and a valved by-pass connection for said power and return conduits disposed at the rear of said control valve and in front of their branch connections to said driven motors.

2. The combination with a running gear frame, an engine, an axle, and a pair of driving wheels, of a fluid driving motor connected directly to said engine, a pair of fluid driven motors mounted on said axle and comprising rotors having shafts on which said driving wheels are mounted, power and return conduits connecting said driving and driven motors, a control valve for said conduits provided with passages and ports permitting the by-passing of a portion or all of the fluid from said power to said return conduit and the delivering of a portion or all of the fluid to said driven motors through either connection to drive the driven motors in either direction, and the stopping of the circulation of the fluid through said driven motors providing a braking means, the power connections and return connections of said driven motors being in communication permitting differential movement thereof, and a valved by-pass connection for said power and return conduits disposed at the rear of said control means.

3. The combination with a running gear frame, an engine, an axle, and a pair of driving wheels, of a fluid driving motor connected directly to said engine, a pair of fluid driven motors mounted on said axle and comprising rotors having shafts on which said driving wheels are mounted, power and return conduits connecting said driving and driven motors, a control valve for said conduits provided with passages and ports permitting the by-passing of a portion or all of the fluid from said power to said return conduit and the delivering of a portion or all of the fluid to said driven motors through either connection to drive the driven motors in either direction, and a valved by-pass connection for said power and return conduits disposed at the rear of said control means.

4. In a motor vehicle, the combination of driving wheels, a fluid driving motor, fluid driven motors connected to said driving wheels, fluid connections for said driving and driven motors comprising a power and a return conduit, a control valve for said power and return conduits provided with passages and ports permitting the by-passing of a portion or all of the fluid from said power to said return conduit or the delivering of a portion or all of the fluid to said driven motors in either direction, a valved by-pass connection for said power and return conduits disposed at the rear of said said control valve.

5. In a motor vehicle, the combination of driving wheels, a fluid driving motor, fluid driven motors connected to said driving wheels, fluid connections for said driving and driven motors comprising a power and a return conduit, a control valve for said conduits provided with passages and ports permitting the by-passing of a portion or all of the fluid from said power to said return conduit and the delivering of a portion or all of the fluid to said driven motors through either connection to drive the driven motors in either direction, or the stopping of the circulation of the fluid through said driven motors providing a braking means, the power connections and return connections of said driven motors being in connection permitting differential movement thereof, and a valved by-pass connection for said power and return conduits disposed at the rear of said control means.

6. In a motor vehicle, the combination of driving wheels, a fluid driving motor, fluid driven motors connected to said driving wheels, fluid connections for said driving and driven motors comprising a power and a return conduit, a control valve for said conduits provided with passages and ports permitting the by-passing of a portion or all of the fluid from said power to said return conduit and the delivering of a portion or all of the fluid to said driven motors through either connection to drive the driven motors in either direction, and a valved by-pass connection for said power and return conduits disposed at the rear of said control means.

7. In a motor vehicle, the combination of a driving wheel, fluid driving motor, fluid driven motor, fluid connections for said driving and driven motors comprising a power and return conduit, a control valve for said conduits provided with passages and ports permitting the by-passing of a portion or all of the fluid from the power motor to said conduit and delivering of a portion or all of the fluid to said driven motor through either connection to drive the motor in either direction, or a stopping of the circulation of the fluid through said driven motor providing a breaking means, and a valved by-pass connection for said power and return conduits disposed between said driven motor and said control means.

8. In a combination with the running gear frame, an engine, an axle, a pair of traction wheels, said axle being provided with end plates, driven motor cylinders comprising body portions secured to said end plates and head plates detachably secured to the outer side of said body portions, said head plates and body portions being provided with bearings, driven rotors in said cylinders, rotor shafts disposed in said bearings and on which said traction wheels are mounted, a driving motor, connections for said driving motor to said driven motors comprising power and return conduits, and control means for said conduits.

9. In a combination with the running gear frame, an engine, an axle, a pair of traction wheels, driven motor cylinders comprising body portion secured to the ends of said axle and head plates detachably secured to the outer side of said body portions, said head plates and body portions being provided with bearings, driven rotors in said cylinders, rotor shafts disposed in said bearings and on which said traction wheels are mounted, a driving motor, connections for said driving motor to said driven motors comprising power and return conduits, and control means for said conduits.

In witness whereof, we have hereunto set our hands and seals in the presence of two witnesses.

CELEST JOSEPH NOEL. [L. S.]
KENNETH K. HICKS. [L. S.]

Witnesses:
RAYMOND W. STARR,
KIRK E. WICKS.